United States Patent
Marche

(10) Patent No.: US 7,156,343 B2
(45) Date of Patent: Jan. 2, 2007

(54) MOUNTING SYSTEM INSERTED BETWEEN AN AIRCRAFT ENGINE AND A RIGID STRUCTURE OF AN ATTACHMENT STRUT FIXED UNDER A WING OF THIS AIRCRAFT

(75) Inventor: Herve Marche, Roquettes (FR)

(73) Assignee: Airbus France, Toulouse (FR)

( * ) Notice: Subject to any disclaimer, the term of this patent is extended or adjusted under 35 U.S.C. 154(b) by 151 days.

(21) Appl. No.: 11/059,440

(22) Filed: Feb. 17, 2005

(65) Prior Publication Data

US 2005/0194492 A1 Sep. 8, 2005

(30) Foreign Application Priority Data

Mar. 4, 2004 (FR) .................................. 04 50444

(51) Int. Cl.
*B64D 27/00* (2006.01)
(52) U.S. Cl. .......................................... 244/54; 60/796
(58) Field of Classification Search .................. 244/54, 244/53 R, 131, 55, 58, 60; 248/554; 60/797, 60/796
See application file for complete search history.

(56) References Cited

U.S. PATENT DOCUMENTS 4,266,741 A 5/1981 Murphy

| | | | |
|---|---|---|---|
| 4,326,682 A | * | 4/1982 | Nightingale .................. 244/54 |
| 4,458,863 A | | 7/1984 | Smith |
| 4,997,145 A | * | 3/1991 | Hodgkinson .................. 244/54 |
| 5,746,391 A | * | 5/1998 | Rodgers et al. ................ 244/54 |
| 6,126,110 A | | 10/2000 | Seaquist et al. |

FOREIGN PATENT DOCUMENTS

WO WO 96/18538 6/1996

* cited by examiner

*Primary Examiner*—Timothy D. Collins
(74) *Attorney, Agent, or Firm*—Oblon, Spivak, McClelland, Maier & Neustadt, P.C.

(57) ABSTRACT

This invention relates to a mounting system (1) inserted between an aircraft engine and a rigid structure of a strut, comprising a thrust resistance device (20) comprising a spreader beam (28) provided with two lateral lower ends (32a) placed such that a horizontal plane passes through them and through a longitudinal axis of the engine. Moreover, the device (20) is also fitted with two fittings (44) each comprising a forward end (44a) through which the said horizontal plane also passes and fixed to a forward part of a central casing (22), and an aft end (44b) connected to one of the ends (32a). Furthermore, the spreader beam is connected to the forward mount and to the rigid structure through its upper end (30b).

12 Claims, 1 Drawing Sheet

MOUNTING SYSTEM INSERTED BETWEEN AN AIRCRAFT ENGINE AND A RIGID STRUCTURE OF AN ATTACHMENT STRUT FIXED UNDER A WING OF THIS AIRCRAFT

TECHNICAL DOMAIN

This invention relates in general to a mounting system inserted between an aircraft engine and a rigid structure of an attachment strut fixed under a wing of this aircraft.

The invention also relates to an attachment strut for an aircraft engine fitted with such a mounting system, and this mounting system and the attachment strut can also be used on any type of aircraft.

STATE OF PRIOR ART

An aircraft attachment strut is designed to form the connecting interface between an engine and a wing of the aircraft. It transmits forces generated by the associated engine to the structure of this aircraft, and it also enables routing of the fuel, electricity, hydraulics and air between the engine and the aircraft.

In order to transmit forces, the strut comprises a rigid structure, for example of the <<caisson>> type, in other words formed by the assembly of upper and lower stringers connected to each other through transverse ribs.

Furthermore, the strut is equipped with a mounting system inserted between the engine and the rigid structure of the strut, this system globally including at least two mounts, generally a forward mount and an aft mount.

Furthermore, the mounting system comprises a system for resisting thrusts generated by the engine. In prior art, this device is typically in the form of two lateral rods connected firstly to a forward part of the central casing of the engine and secondly to the aft mount.

Similarly, the attachment strut also comprises a second mounting system inserted between the strut and the wing of the aircraft, this second system normally being composed of two or three mounts.

Finally, the strut is provided with a secondary structure segregating and maintaining the systems while supporting aerodynamic fairings.

In a manner known to those skilled in the art, thrusts generated by the engine normally cause more or less severe longitudinal bending of the engine, namely bending resulting from a torque generated from the thrusts and applied along a transverse axis of the aircraft. In this respect, note also that thrusts are the sole cause of longitudinal bending of the engine during aircraft cruising phases.

Two cases can arise when this type of longitudinal bending occurs, particularly during the aircraft cruising phases. In a first case in which no particular precautions have been taken related to the observed bending, high friction inevitably occurs firstly between the rotating blades of the fan and the fan casing, and secondly between the rotating compressor and turbine blades and the engine central casing. The main consequence of this friction is then premature engine wear, which naturally reduces the life of the engine and its performances. In a second case in which operating clearances are adapted such that there is practically no contact caused by longitudinal bending, the engine efficiency is then very much reduced.

Considering the above, it is obviously necessary to design a device for resisting thrusts that minimizes longitudinal bending of the engine due to these thrusts, so as to minimize constraining friction without needing to oversize the operating clearances mentioned above.

It has been observed that none of the thrust resistance devices according to prior art is capable of entirely and satisfactorily limiting longitudinal bending of the engine resulting from the torque about the transverse axis related to thrusts, particularly during aircraft cruising phases.

OBJECT OF THE INVENTION

Therefore, the purpose of the invention is to propose a mounting system inserted between an aircraft engine and a rigid structure of an attachment strut fixed under a wing of this aircraft, this system at least partially overcoming the disadvantages mentioned above related to embodiments according to prior art.

Another purpose of this invention is to present an attachment strut for an aircraft engine provided with such a mounting system.

To achieve this, the object of the invention is a mounting system inserted between an aircraft engine and a rigid structure of an attachment strut fixed under a wing of this aircraft, the system including a forward mount, an aft mount, and a device for resisting thrusts generated by the engine. According to the invention, the thrust resistance device comprises a spreader beam provided with an upper arm and two lateral lower arms, the upper and lateral lower arms being fixed and fitted with an upper end and two lateral lower ends of the spreader beam, the two lateral lower ends being placed such that a horizontal plane passes through them and through a longitudinal axis of the engine, the thrust resistance device also being fitted with two fittings on each side of the engine and each comprising a forward end, through which the horizontal plane passing through the longitudinal axis of the engine also passes, and fixed to a forward part of a central casing of the engine and an aft end connected to one of the two lateral lower ends of the spreader beam, and in that the spreader beam is also connected to the forward mount of the mounting system, and to the rigid structure of the attachment strut through its upper end.

Advantageously, the mounting system according to the invention includes a thrust resistance device that considerably improves the resistance of these forces compared with the resistance observed in prior art using the conventional lateral connecting rods solution, since this device can entirely eliminate the torque about the transverse axis applied to the engine related to these thrusts.

Consequently, the presence of such a thrust resistance device during aircraft cruising phases prevents any longitudinal bending from being applied to the engine. As a result, there is no premature wear of the engine constituents, and therefore the life and performances of the engine are no longer reduced.

Elimination of longitudinal bending in the engine due to thrusts is obtained firstly due to the fact that these forces are resisted in the horizontal plane passing through the longitudinal axis of the engine, which is very advantageous provided that the thrusts are created on the longitudinal axis of this engine.

The proposed arrangement is such that the two lateral lower ends of the spreader beam are located in this horizontal plane passing through the longitudinal axis of the engine, so that they can be connected to the fittings also placed in the same horizontal plane and connected to the forward part of the central casing of the engine.

Furthermore, the thrusts initially resisted in the horizontal plane passing through the longitudinal axis of the engine, through the fittings and lateral lower ends of the spreader beam, are then transported upwards along the length of this spreader beam to three arms stressed in bending. Thrusts transported by the spreader beam are then distributed in two axial forces in opposite directions along the longitudinal direction of the aircraft, one being transmitted to the forward mount to which the spreader beam is connected, and the other being transmitted to the rigid structure of the strut to which the upper end of this spreader beam is connected.

Finally, note that the mounting system is advantageously a statically determinate system, which very much facilitates its design.

Preferably, the spreader beam is connected to the forward mount through at least one swivel pin oriented along a transverse direction of the aircraft. Consequently, one of the two axial forces in opposite directions along the longitudinal direction of the aircraft is exerted along this axis before being transmitted to the forward mount.

In this case, it is then possible that each swivel pin passes one double headed end of a forward mount body, and a lower end of the upper arm of the spreader beam.

Preferably, the upper end of the upper arm is connected to a rigid structure of the attachment strut through a connecting rod, this connecting rod preferably being oriented approximately along a longitudinal direction of the aircraft, and an aft end of the said connecting rod cooperating with a forward part of an upper stringer of the rigid structure of the attachment strut.

Furthermore, the upper end of the upper arm may be connected to a forward end of the connecting rod through at least one swivel pin oriented along a transverse direction of the aircraft. Thus, this is the axis along which the other of the two axial forces in opposite directions and oriented along the longitudinal direction of the aircraft is exerted, before being transmitted to the rigid structure of the strut.

To achieve this, a fitting fixed to the forward part of the upper stringer of the rigid structure of the attachment strut is provided, this fitting preferably being connected to the aft end of the connecting rod, still through at least one pin oriented along this same transverse direction of the aircraft.

Naturally, the above mentioned rod may be replaced by a stringer forming an integral part of the rigid structure of the strut, without departing from the scope of the invention. With such an arrangement, the upper end of the upper arm could then for example be connected to a forward end of the stringer using a ball joint integrated into the stringer.

Also preferably, each of the aft ends of the two fittings fixed to the forward part of the central casing of the engine is connected to one of the two lateral lower ends of the spreader beam through a connecting rod.

Another object of the invention is an attachment strut for an aircraft engine under a wing of this aircraft, the strut being provided with a mounting system inserted between the engine and a rigid structure of this strut. According to the invention, the mounting system is like that described above and is also one purpose of this invention.

Other advantages and special features of the invention will become clearer in the non-limitative detailed description given below.

BRIEF DESCRIPTION OF THE DRAWINGS

This description will be made with reference to the single FIG. representing a perspective view of a mounting system inserted between an aircraft engine and a rigid structure of an attachment strut fixed under a wing of this aircraft, according to a preferred embodiment of this invention.

DETAILED DESCRIPTION OF PREFERRED EMBODIMENTS

Figure 1:
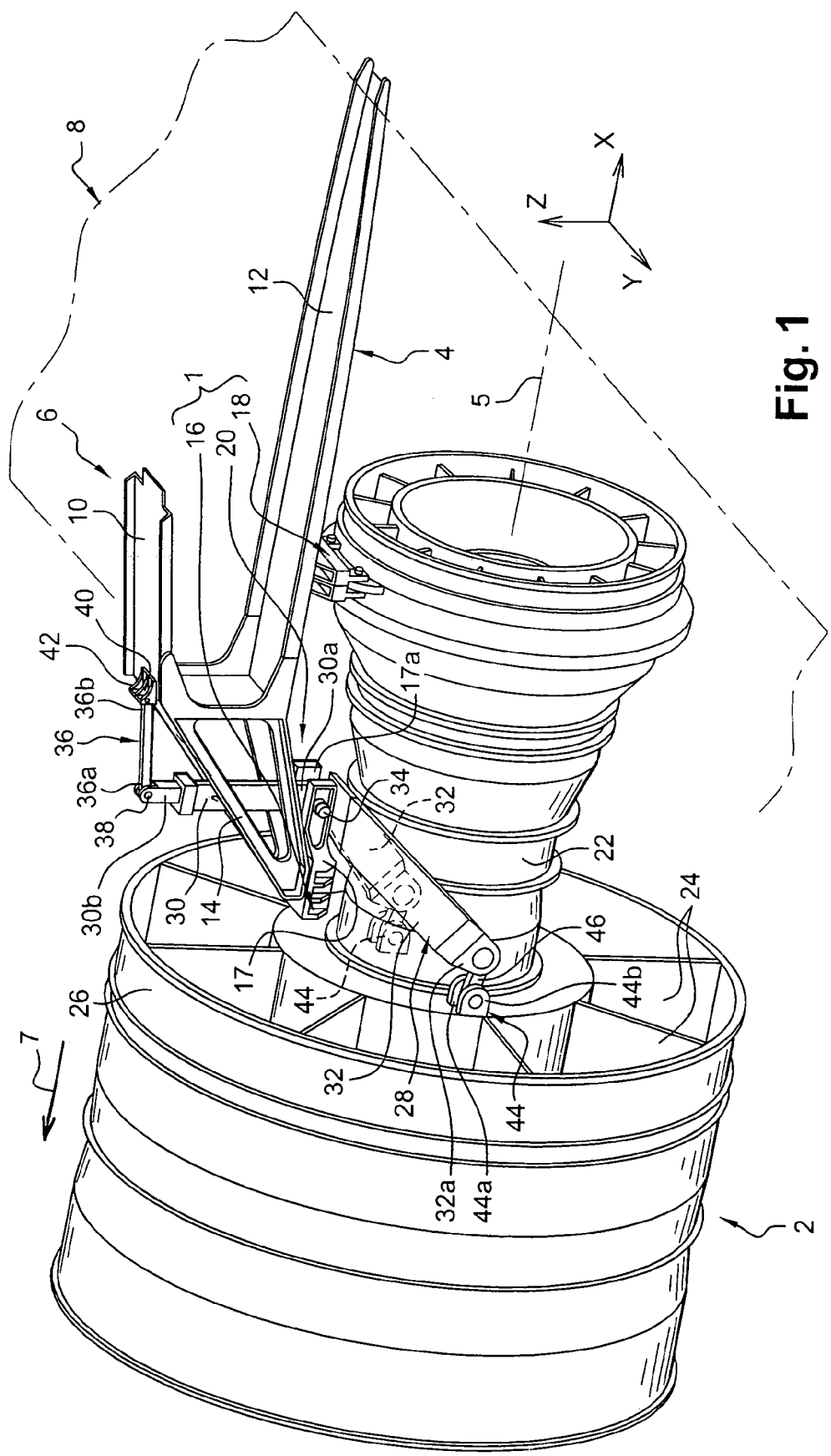

The single FIG. shows a mounting system 1 according to a preferred embodiment of this invention, this mounting system 1 being inserted between an aircraft engine 2 and a rigid structure 4 of an attachment strut 6 fixed under an aircraft wing shown diagrammatically for obvious reasons of clarity, and denoted generally by the numeric reference 8. Note that the mounting system 1 shown on this single FIG. is adapted to cooperate with a turbojet 2, but obviously it could be a system designed to suspend any other type of engine such as a turboprop, without departing from the scope of the invention.

Throughout the description given below, by convention, X is the direction parallel to a longitudinal axis 5 of the engine 2, Y is the direction oriented in the transverse direction of the aircraft, and Z is the vertical direction, these three directions being orthogonal to each other.

Secondly, the terms <<forward>> and <<aft>> should be considered with respect to a direction of movement of the aircraft that takes place as a result of the thrust applied by the engines 2, this direction being shown diagrammatically by the arrow 7.

Only one portion of the rigid structure 4 of the attachment strut 6 is shown on the single FIG. obviously accompanied by the mounting system 1 forming an integral part of this strut 6, this strut also being one purpose of this invention.

The other component elements of this strut 6 that are not shown, such as the attachment means of the rigid structure 4 under aircraft wing 8, or the secondary structure segregating and maintaining systems while supporting aerodynamic fairings, are conventional elements identical to or similar to those encountered in prior art, and known to those skilled in the art. Consequently, they will not be described in detail herein.

In a known manner, it is indicated that the rigid structure 4 is globally made by the assembly of lower stringers 12 and upper stringers 10 connected to each other through several transverse ribs (not shown). Furthermore, a forward part of this rigid structure 4 is composed of a pyramid 14, also known to those skilled in the art and therefore in the form of a structure starting from a base and extending towards a vertex in the forward direction, getting closer to the longitudinal axis 5 of the engine 2.

In the preferred embodiment of the present invention shown on the single FIG. the mounting system 1 comprises firstly a forward mount 16, an aft mount 18 and a device 20 resisting thrusts generated by the engine 2. In this respect, note that the two mounts 16 and 18 mentioned above are of the conventional type and are known to those skilled in the art. Consequently, they will only be described briefly, for information and in no way limitatively.

The forward mount 16 is fixed firstly to a forward end of the pyramid 14 of the rigid structure 4, in other words its vertex, and secondly fixed to a forward part of a central casing 22 of the engine 2. More precisely, the forward mount 16 penetrates into a portion of the central casing 22 on which fixed blades 24 are fitted connecting a fan casing 26 of the engine 2 to this same central casing 22.

This forward mount 16 comprises generally a ball joint (not shown), also called a <<monoball>>, that penetrates inside the central casing 22 to resist forces along the vertical Z direction and along the transverse Y direction. Moreover, the forward mount 16 comprises a body 17 in which the aft end 17a will be exposed in a manner described in more detail below.

Furthermore, the aft mount 18 is fixed firstly to an aft part of the central casing 22, and is fixed secondly to a lower stringer 12 of the rigid structure of the strut 6. The conventional aft mount 18 shown on the single FIG. is composed globally of devises and fittings, and resists forces along the Y and Z directions, and resists the moment applied about the X direction.

The special feature of this invention is in the fact that the mounting system 1 comprises a thrust resistance device 20 designed to completely cancel the longitudinal bending of the engine 2 resulting from a torque about the transverse axis related to these thrusts. Thus, there is no longitudinal deformation of this engine 2 during aircraft cruising phases in which the longitudinal bending of the engine 2 is normally exclusively due to thrusts.

Firstly, note that a vertical XY plane passing through the longitudinal axis 5 of the engine 2 forms a plane of symmetry for the thrust resistance device 20.

As can be clearly seen on the single FIG. this device 20 comprises mainly a spreader beam 28 globally in the form of a fork, and therefore provided with three arms 30, 32 fixed to each other. Among these three arms, there is firstly an upper arm 30 oriented along the vertical z direction perpendicular to the longitudinal axis 5 of the engine 2. Consequently, this upper arm 30 is straight and is arranged in the vertical XZ plane passing through the longitudinal axis 5 above the central casing 22.

Furthermore, there are also two lateral lower arms 32 symmetric about the vertical XZ plane passing through the longitudinal axis 5 of the engine 2, and being curved so that they can be correctly arranged around the central casing 22. Moreover, the distance between these lower arms 32 and a horizontal XY plane passing through the longitudinal axis 5 increases towards the aft direction, as can be seen on the single FIG. Thus, the two lower arms 32 extend downwards at least as far as the horizontal XY plane passing through the longitudinal axis 5, and upwards as far as the vertical XZ plane passing through this same axis. In this respect, when combined they form an approximate half-ring located in a plane inclined from the longitudinal X direction and the vertical Z direction, and not inclined with respect to the transverse Y direction.

As an example given for guidance, the spreader beam 28 may be made using two parts one fixed to the other symmetrically about the vertical XZ plane passing through the axis 5.

In order to make the junction between the spreader beam 28 and the forward mount 16, the forward mount body 17 of the forward mount spreader beam comprises an aft end 17a with a double head in which each of the heads (not referenced) extends along the longitudinal X direction, and between which a lower end 30a of the upper arm 30 is located.

In this way, a swivel pin 34 or ball joint oriented along the transverse Y direction passes through the two heads of the aft end 17a and the lower end 30a cooperating with a ball joint of the pin 34, these elements 17a and 30a obviously being provided with orifices enabling such a mounting system.

Furthermore, the upper arm 30 also comprises an upper end 30b with a double head in which each of the heads (not referenced) extends along the vertical Z direction, and between which a forward end 36a of a connecting rod 36 creating a ball joint junction between the rigid structure 4 and the spreader beam 28 is located. For information, note that this end 30b also forms the upper end of the spreader beam 28.

In this way, a swivel pin 38 or a ball joint oriented along the transverse Y direction passes through the two heads of the upper end 30b and the forward end 36b cooperating with a ball joint about the swivel pin 38, in this case these elements 30b and 36a obviously also being provided with orifices enabling such a mounting system.

The rod 36 extends approximately along the longitudinal X direction as far an aft end 36b located between the two heads (not referenced) of a double headed fitting 40, fixed to the forward part of the upper stringer 10 of the rigid structure 4. Once again, a swivel pin 42 oriented along the transverse Y direction passes through the two heads of the fitting 40 extending along the longitudinal X direction and the aft end 36b of the connecting rod 36.

Naturally, the rod 36 may extend along a direction other than the X direction, and is preferably arranged parallel to the upper stringer 10.

As can be seen on the single FIG. the upper arm 30 passes through the pyramid 40, which advantageously contributes to obtaining a compact mounting system 1.

At the moment, concerning the lateral lower arms 32 and their associated elements that will be presented below, note that only one of these two arms 32 will be described in full, since they are identical and symmetrical about the fictitious XY vertical plane passing through the longitudinal axis 5.

Thus, each arm 32 comprises a lower end 32a located in the fictitious horizontal XY plane passing through the longitudinal axis 5, in other words the end lies in this plane so that the thrusts are resisted at the locations at which they are created. Also for guidance, note that this end 32a also forms a lower lateral end of the spreader beam 28.

A fitting 44, preferably a double headed fitting, is associated with the arm 32 and extends along the longitudinal X direction. This fitting 44 comprises a forward end 44a lying in the horizontal XY plane passing through the axis 5, and is fixed to the forward part of the central casing 22. It also comprises an aft end 44b connected to the lateral lower end 32a of the arm 32, consequently this aft end 44b being in the horizontal XY plane passing through the axis 5.

In the preferred embodiment described, in order to make the junction between the aft end 44b of the double headed fitting 44 and the lateral lower end 32a of the arm 32, a rod 46 is used along the X direction in the horizontal XY plane passing through the axis 5. Consequently, the rod 46 may for example be connected so as to be hinged between the two heads (not referenced) of the aft end 44b of the fitting 44, and also mounted hinged onto the lateral lower end 32a of the arm 32.

Nevertheless, although the connecting rod solution is preferred, it would also have been possible to use any other similar system without departing from the scope of the invention.

With this configuration, during aircraft cruising phases and due to thrusts generated by the engine 2, an axial force is applied to each of the two lateral lower ends 32a in the forward direction along the X direction. Furthermore, the lower end 30a of the upper arm 30 is subjected to an axial force along the aft direction along the X direction, while an axial force is applied to the upper end 30b of this upper arm 30 in the forward direction along the same direction. Thus, these axial forces are such that the moment about the transverse axis due to thrusts and applied to the engine 2 is zero, such that the engine is not subjected to any longitudinal bending.

Obviously, those skilled in the art could made various modifications to the mounting system 1 and to the attachment strut 6 that have just been described as non-limitative examples only.

The invention claimed is:

1. Mounting system (1) inserted between an aircraft engine (2) and a rigid structure (4) of an attachment strut (6) fixed under a wing (8) of an aircraft, the system including a forward mount (16), an aft mount (18), and a device (20) for resisting thrusts generated by the engine (2), characterized in that the said thrust resistance device (20) comprises a spreader beam (28) provided with an upper arm (30) and two lateral lower arms (32), the upper and lateral lower arms (30,32) being fixed and fitted with an upper end (30b) and two lateral lower ends (32a) of the spreader beam (28), the two lateral lower ends (32a) being placed such that a horizontal plane passes through them and through a longitudinal axis (5) of the engine (2), the thrust resistance device (20) also being fitted with two fittings (44) on each side of the engine (2) and each comprising a forward end (44a) through which the horizontal plane passing through the longitudinal axis (5) of the engine (2) also passes, and fixed to a forward part of a central casing (22) of the engine, and an aft end (44b) connected to one of the two lateral lower ends (32a) of the spreader beam (28), and in that the said spreader beam (28) is also connected to the forward mount (16) of the mounting system, and to the rigid structure (4) of the attachment strut (6) through its upper end (30b).

2. Mounting system (1) according to claim 1, characterized in that the said spreader beam (28) is connected to the forward mount (16) through at least one swivel pin (34) oriented along a transverse direction (Y) of the aircraft.

3. Mounting system (1) according to claim 2, characterized in that each swivel pin (34) passes through a double headed end (17a) of a forward mount body (17), and a lower end (30a) of the upper arm (30) of the said spreader beam (28).

4. Mounting system (1) according to any one of the above claims, characterized in that the upper end (30b) of the upper arm (30) is connected to the rigid structure (4) of the attachment strut (6) through a connecting rod (36).

5. Mounting system (1) according to claim 4, characterized in that the said connecting rod (36) is oriented approximately along a longitudinal direction (X) of the aircraft, and in that an aft end (36b) of the said connecting rod (36) cooperates with a forward part of an upper stringer (10) of the rigid structure (4) of the attachment strut (6).

6. Mounting system (1) according to claim 5, characterized in that the upper end (30b) of the upper arm (30) is connected to a forward end (36a) of the said connecting rod (36) through at least one swivel pin (38) oriented along a transverse direction (Y) of the aircraft, and in that a fitting (40) fixed to the forward part of the upper stringer (10) of the rigid structure (4) of the attachment strut (6) is connected to the aft end (36b) of the said connecting rod (36) through at least one swivel pin (42) oriented along this same transverse direction (Y) of the aircraft.

7. Mounting system (1) according to claim 6, characterized in that the upper end (30b) of the upper arm (30) and the said fitting (40) are double headed.

8. Mounting system (1) according to claim 1, characterized in that each aft end (44b) of the two fittings (44) fixed to the forward part of the central casing (22) of the engine (2) is connected to one of the two lateral lower ends (32a) of the spreader beam (28) using a connecting rod (46).

9. Mounting system (1) according to claim 1, characterized in that the upper arm (30) of the spreader beam (28) is straight and is oriented along a vertical direction (Z) of the aircraft, and in that the two lateral lower arms (32) combined form an approximate half-ring.

10. Mounting system (1) according to claim 1, characterized in that the said system comprises a forward mount (16) fixed to the forward part of the central casing (22) of the engine (2) and a forward end of a pyramid (14) forming a forward part of the rigid structure (4) of the strut (6), and in that the said system also comprises an aft mount (18) fixed to an aft part of the central casing (22) of the engine (2) and the rigid structure (4) of the strut (6).

11. Mounting system (1) according to claim 10, characterized in that the upper arm (30) of the spreader beam (28) is arranged so as to pass through the said pyramid (14) of the rigid structure (4) of the strut (6).

12. Attachment strut (6) of an aircraft engine (2) under a wing (8) of an aircraft, the said strut being provided with a mounting system (1) inserted between the said engine (2) and a rigid structure (4) of this strut, characterized in that the said mounting system (1) is a system according to claim 1.

* * * * *